US006351976B1

(12) United States Patent
Chen

(10) Patent No.: US 6,351,976 B1
(45) Date of Patent: Mar. 5, 2002

(54) DOOR LOCK ASSEMBLY

(76) Inventor: Waterson Chen, 8F, No.428, Wu-Chuan-Nan Rd., Taichung City (TW)

( * ) Notice: Subject to any disclaimer, the term of this patent is extended or adjusted under 35 U.S.C. 154(b) by 0 days.

(21) Appl. No.: 09/395,522

(22) Filed: Sep. 14, 1999

(51) Int. Cl.[7] .............................................. B60R 25/00
(52) U.S. Cl. ......................... 70/224; 70/209; 292/336.3
(58) Field of Search .......................... 70/224, 450, 209, 70/210, 448, 207, 419, 451, 452, 416, 449, 381, 472; 292/356, 357, 337, 336.3, DIG. 53, DIG. 54

(56) References Cited

U.S. PATENT DOCUMENTS

| | | | | |
|---|---|---|---|---|
| 5,904,232 A | * | 5/1999 | Shen | 70/224 |
| 5,941,108 A | * | 8/1999 | Shen | 70/224 |
| 6,038,894 A | * | 3/2000 | Hu | 70/224 |
| 6,101,856 A | * | 8/2000 | Pelletier et al. | 70/224 |
| 6,141,998 A | * | 11/2000 | Seo | 70/224 |
| 6,216,500 B1 | * | 4/2001 | Kang | 292/336.3 |

* cited by examiner

*Primary Examiner*—Richard M. Camby
(74) *Attorney, Agent, or Firm*—Merchant & Gould P.C.

(57) ABSTRACT

A door lock assembly includes a latching mechanism for latching a door. The latching mechanism has a hollow housing, a latch bolt with a tapered head portion and a body portion mounted slidably in the housing, an actuating block, a connecting member connected to the latch bolt, and a crank arm interconnecting the actuating block and the connecting member. The latch bolt is movable between a first latching position wherein both of the head portion and the body portion extend outwardly of the hollow housing, and a second latching position wherein only the head portion extends outwardly of the hollow housing. The crank arm is turned to an inward position when the latch bolt is in the second latching position. The crank arm is turned to an outward position when the latch bolt is in the first latching position. A spring is mounted in the housing and biases the latch bolt to move to the first latching position. A retaining member is disposed on the housing for retaining the crank arm in the inward position against the action of the spring. A releasing member is disposed in the hollow housing for causing the crank arm to be released from the retaining member when the latch bolt is moved to an unlatching position from the second latching position, thereby moving the latch bolt to the first latching position.

22 Claims, 18 Drawing Sheets

DOOR LOCK ASSEMBLY

BACKGROUND OF THE INVENTION

1. Field of the Invention

This invention relates to a door lock assembly, more particularly to a door lock assembly that has an improved anti-picking effect and that can be manipulated conveniently.

2. Description of the Related Art

It is known that a conventional tubular lock incorporates a spring-biased latch bolt that has a head portion with a tapered face and a flat face. The head portion extends out from a faceplate mounted on a door, and is inserted into a socket portion of a strike plate that is embedded in a doorframe when the door is closed. A handle of the tubular lock can be locked by depressing a push-button into an inside tube of the tubular lock to prevent the door from being opened by an unauthorized person. However, the unauthorized person can easily open the door by extending a stick or the like into the socket portion of the strike plate through a clearance between the door and the doorframe and by pushing the tapered face of the head portion into the door through the opening in the faceplate. Therefore, the anti-picking effect of the tubular lock is relatively poor. Although a conventional mortise can provide an improved anti-picking effect with the use of a dead bolt, the dead bolt must be manipulated by a key when it is desired to lock or unlock the door. This inconveniences the user.

SUMMARY OF THE INVENTION

The object of the present invention is to provide a door lock assembly that has an improved anti-picking effect and that can be manipulated conveniently.

According to the present invention, a door lock assembly comprises:

a latching mechanism adapted to latch a door, the latching mechanism including:

an elongated hollow housing which has an outer end, and an inner end opposite to the outer end;

a latch bolt mounted slidably inside the hollow housing adjacent to the outer end of the hollow housing, and including an outer tapered head portion and an inner body portion formed inwardly of the tapered head portion;

an actuating block for actuating the latch bolt, the actuating block having two opposed ends journalled in the hollow housing adjacent to the inner end;

a connecting member disposed inwardly of the latch bolt and connected telescopically to the inner body portion;

a crank arm having opposite first and second ends, the first end being connected to the actuating block so as to be turned by the actuating block to move the second end, the second end being connected to the connecting member so as to move the latch bolt via the connecting member, to a first latching position in which both of the tapered head portion and the inner body portion extend outwardly of the outer end of the hollow housing and a second latching position in which only the tapered head portion extends outwardly of the outer end of the hollow housing, the latch bolt being in the second latching position when the second end is turned to an inward position adjacent to the inner end of the hollow housing, the latch bolt being in the first latching position when the second end is turned to an outward position;

a spring mounted inside the hollow housing for biasing the latch bolt to move to the first latching position;

retaining means disposed on the hollow housing for retaining the second end in the inward position so as to place the latch bolt in the second latching position against the action of the spring;

telescopic joint means for joining the connecting member to the inner body portion so that the latch bolt is retractable inward relative to the connecting member against the action of the spring to move to an unlatching position; and releasing means disposed inside the hollow housing for causing the second end to be released from the retaining means when the latch bolt is moved to the unlatching position from the second latching position, thereby moving the latch bolt to the first latching position.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
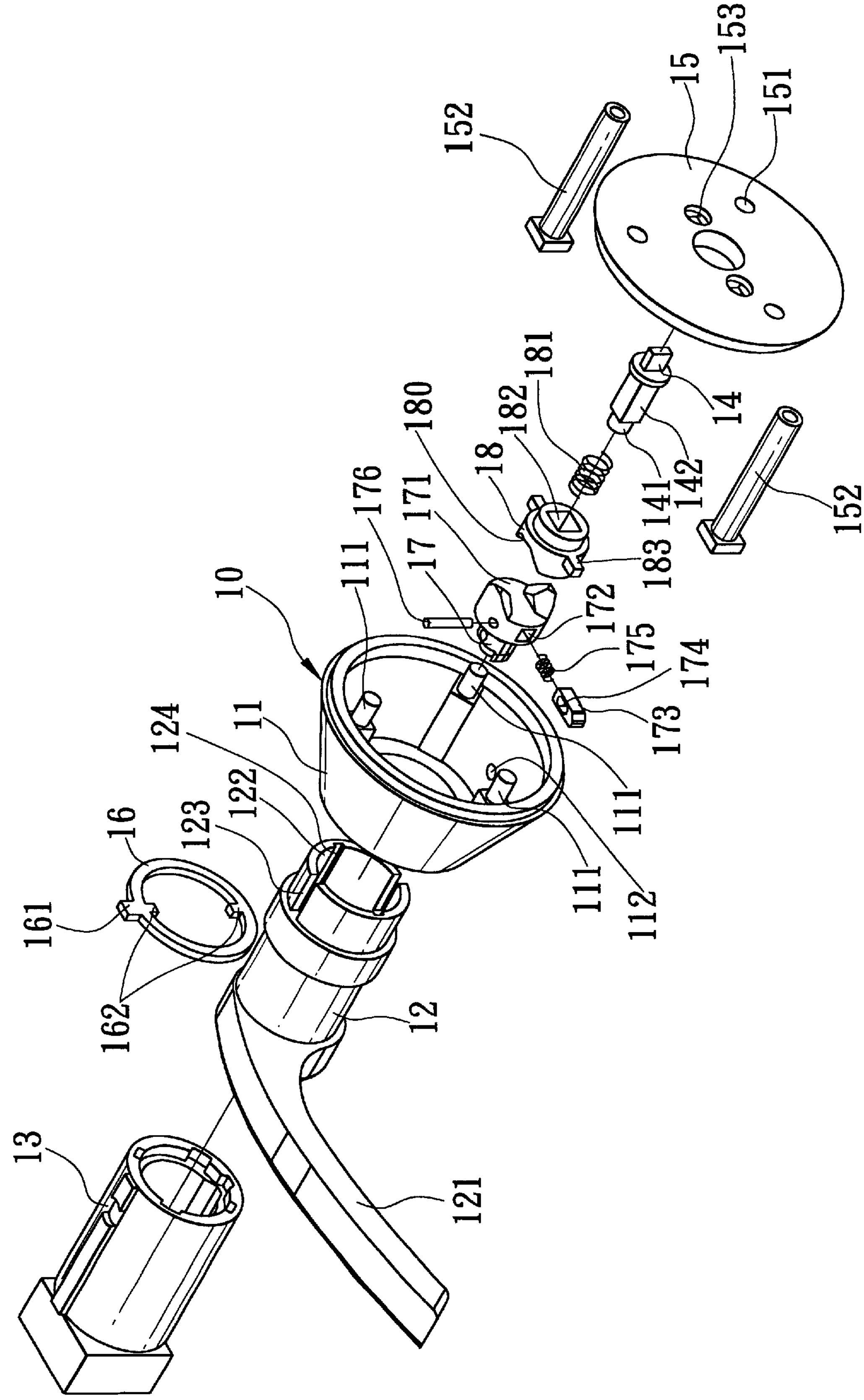
FIG. 1 is an exploded view of a front locking mechanism of a preferred embodiment of a door lock assembly according to the present invention.
Figure 2:
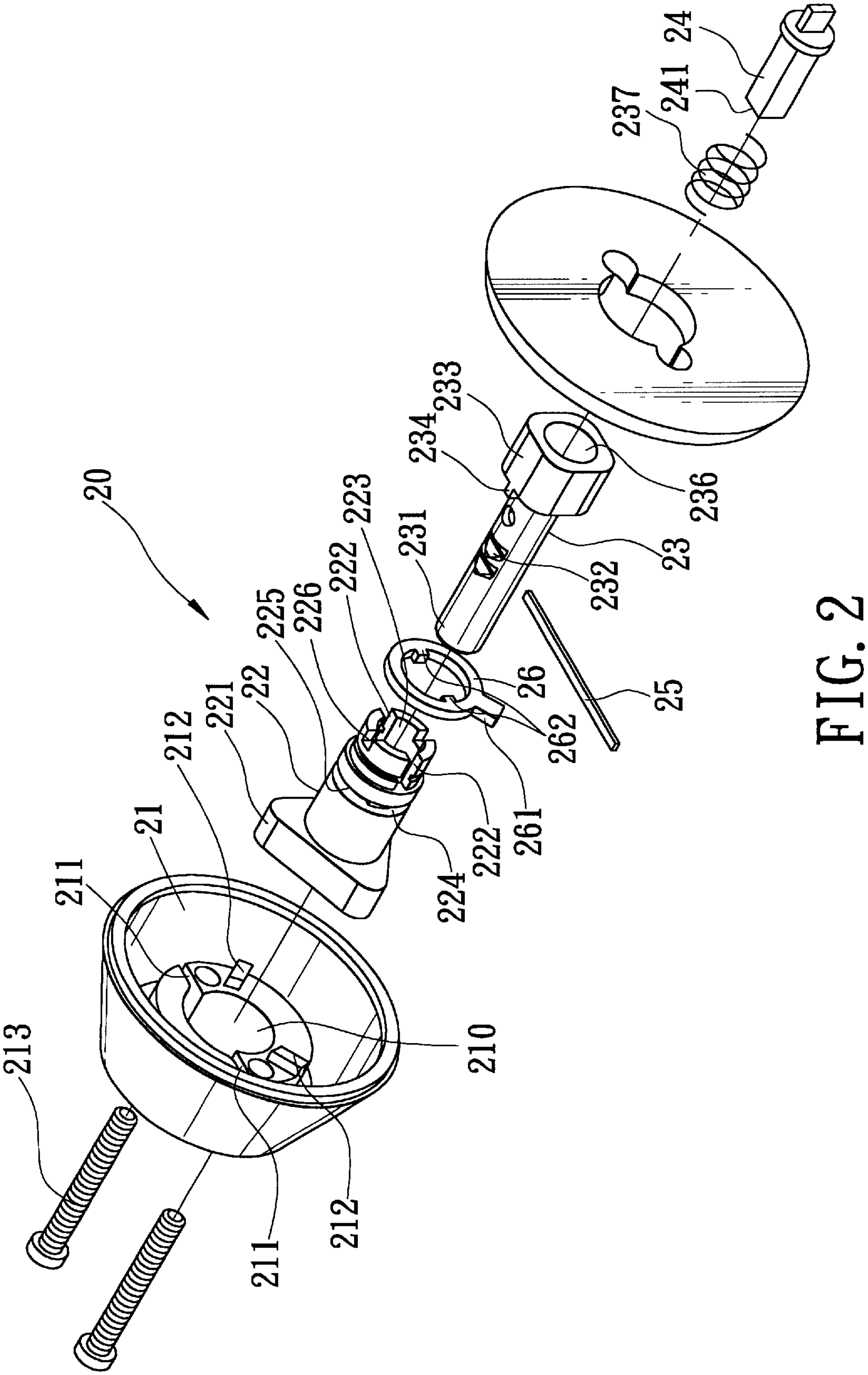
FIG. 2 is an exploded view of a rear locking mechanism of the preferred embodiment of the door lock assembly according to the present invention.
Figure 3:
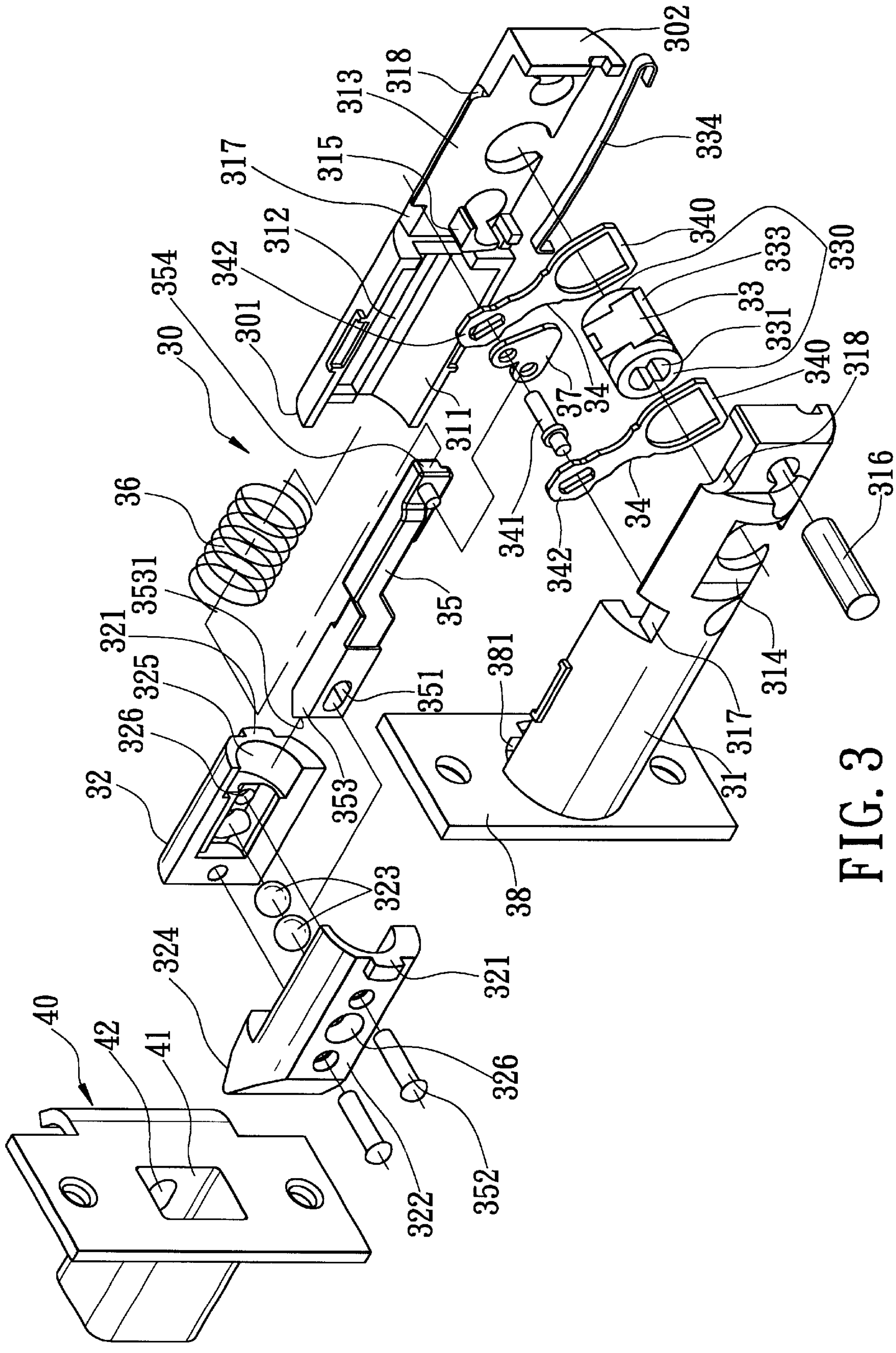
FIG. 3 is an exploded view of a latching mechanism of the preferred embodiment of the door lock assembly according to the present invention.

Referring to FIGS. 1 to 5, a preferred embodiment of a door lock assembly according to the present invention is shown to comprise a front locking mechanism 10, a rear locking mechanism 20, a latching mechanism 30, and a strike plate 40.

The front locking mechanism 10 is disposed on a front face of a door 100, and has a front casing 11, a handle 12, a key-operated lock 13 and a first driving piece 14. In this embodiment, the front locking mechanism 10 is in the form of a lock with a horizontal handle. The front casing 11 is cup-shaped and has a plurality of axial pillars 111 formed therein. The axial pillars 111 are inserted into holes 151 formed in a rose 15. Two connection pillars 152 extend through positioning holes 153 formed in the rose 15 and the door 100, and engage the rear locking mechanism 20 in order to fix the front locking mechanism 10 to the front face of the door 100. In addition, the front casing 11 has an aperture 112 formed therein. The handle 12 has a tubular portion mounted rotatably on and extending coaxially through the front casing 11. The tubular portion of the handle 12 has a front end that is connected to a horizontal grip 121, and an axial through hole 122 in which the lock 13 is received rotatably. The tubular portion of the handle 12 further has two diametrically opposed notches 123 formed at a rear end thereof, two opposed guide grooves 124 formed in an internal wall thereof and extending forwardly from the rear end thereof, and an insertion hole 125 that is aligned with the aperture 112 in the front casing 11.

A stop ring 16 is sleeved onto the inner end of the tubular portion of the handle 12, and has an outwardly extending radial projection 161 formed on an outer periphery thereof, and two diametrically opposed protrusions 162 formed on an inner periphery thereof and engaging respectively the notches 123. When the handle 12 is rotated by about 90 degrees, the projection 161 abuts against one of the axial pillars 111. As such, the rotation angle of the handle 12 is limited within a predetermined range. The key-operated lock 13 includes a core 131, a plurality of circular plate tumblers 132 disposed in the core 131, and a driving disc 133. The core 131 is made of a special alloy to protect the key-operated lock 13 from being drilled or damaged by an unauthorized person. The driving disc 133 has a projection 1331 extending axially from a periphery thereof. A first clutch member 17 is connected to the driving disc 133 at a front end thereof such that the first clutch member 17 is rotatable with the key-operated lock 13 by the projection 1331 when a key (not shown) is inserted into the key-operated lock 13 to rotate the core 131. A first cam face 171 is formed at a rear end of the first clutch member 17. A second clutch member 18 interconnects the first clutch member 17 and the first driving piece 14 so that the first driving piece 14 can be rotated by the key that is inserted into the key-operated lock 13. The first clutch member 17 has a rectangular radial hole 172 extending inwardly from an external face thereof, a locking pin 173 received in the radial hole 174, and a spring 175 connected to an inner end of the locking pin 173 to urge the locking pin 173 to extend out from the external face of the first clutch member 17. A longitudinal slot 174 is formed through the locking pin 173. A positioning pin 176 extends through the first clutch member 17 and the longitudinal slot 174 in order to retain the locking pin 173 in the radial hole 172. An end of the locking pin 173 engages a shoulder 126 formed on the internal wall of tubular portion of the handle 12. As such, the key-operated lock 13 can be retained in the though hole 122 of the handle 12. The second clutch member 18 has a second cam face 180 at a front end thereof. The first driving piece 14 has a front end 141 of a circular cross-section and an intermediate section 142 of a rectangular cross-section, and a spring member 181 disposed between the first driving piece 14 and the second clutch member 18 to urge the first and second cam faces 171, 180 to abut against one another. The second clutch member 18 further a rectangular axial hole 182 extending therethrough into which the front end 141 of the first driving piece 14 extends, and two guide bosses 183 extending oppositely therefrom and engaging respectively the guide grooves 124. Therefore, the second clutch member 18 is connected slidably and axially to and is non-rotatable relative to the tubular portion of the handle 12. The second cam face 180 is moved away the first cam face 171 when the first clutch member 17 is rotated by the key-operated lock 13. That is, the first clutch member 17 cams the second clutch member 18 to move rearward to engage the rectangular axial hole 182 and the intermediate section 142 of the first driving piece 14. At this time, the first driving piece 14 can be rotated by rotating the handle 12.

The rear locking mechanism 20 is disposed on a rear face of the door 100 and is opposite to the front locking mechanism 20. The rear locking mechanism 20 has a rear casing 21, a release tube 22, a spindle 23 and a second driving piece 24. The rear casing 21 is a cup-shaped member with a hole 210 having a positioning groove 211 formed in an inner wall thereof adjacent to the hole 210, a resilient retaining beam 25 inserted into the positioning groove 211 across the hole 210, and two stop bosses 212 formed adjacent to the positioning groove 211. Two fastening screws 213 extend through the rear casing 21 and engage the connection pillars 152 in order to secure the front and rear locking mechanisms 10, 20 to the door 100. The release tube 22 extends through the hole 210 of the rear casing 21, and has a rear end that extends out from the rear casing 21 and that is formed with a triangular head 221. Two axial grooves 222 are formed oppositely on an external face adjacent to a front end of the release tube 22. A positioning ring 26 has a projection 261 formed on an outer periphery thereof and two diametrically opposed projections 262 formed on an inner periphery thereof. The projections 262 engage the axial grooves 222 so that the positioning ring 26 is rotatable with the release tube 22. The projection 261 abuts against one of the stop bosses 212 when the release tube 22 is rotated. As such, the rotation angle of the release tube 22 is limited by the stop bosses 212. The release tube 22 further has a through bore 223, a helical groove 224 formed in the external face thereof, a slot 225 formed at an end section of the helical groove 224 to communicate with the through bore 223, and an engaging notch 226 formed in the front end thereof. The spindle 23 extends through the through bore 223 of the release tube 22 in a slidable and rotatable relationship, and has a rear end 231 extending out from the rear end of the release tube 22, two cutouts 232 formed in an external face thereof, and a rectangular front end 233. The rectangular front end 233 has an engaging rib 234 that is formed on the external face of the spindle 23 and that engages the engaging notch 226 in the release tube 22. As such, the spindle 23 and the release tube 23 can rotate together. The spindle 23 has a blind bore extending rearwardly from the rectangular front end 233 and having a front section 236 of a circular cross-section and a rear section 235 of the blind bore of a rectangular cross-section. The second driving piece 24 has a rear end 241 of a rectangular cross-section inserted telescopically into the rear section 235 in the spindle 23 in order to rotate together with the spindle 23. A spring member 237 is sleeved on the rear end 241 of the second driving piece 24, and is disposed in the front section 236 in the spindle 23 to urge the spindle 23 to a released position where the engaging rib 234 on the spindle 23 engages the engaging notch 226 in the release tube 22. When spindle 23 is compressed at its rear end 231 to move forwardly to a locked position, where the resilient retaining beam 25 snaps into and engages one of the cutouts 232 in the spindle 23 through the slot 225, the spindle 23 is positioned with respect to the rear casing 21. When the helical groove 224 is rotated together with the release tube 22, the resilient retaining beam 25 moves along the helical groove 224 and moves upwardly to disengage from the cutout 232. The spindle 23 is then released from the locked position to the released position due to the action of the spring member 237.

The latching mechanism 30 is embedded in the door 100 between the front and rear locking mechanisms 10, 20. The latching mechanism 30 has an elongated hollow housing 31, a latch bolt 32, an actuating block 33, two crank arms 34, and a connecting rod 35. The hollow housing 31 has an outer end 301, an inner end 302 opposite to the outer end 301, a faceplate 38 with an opening 381 formed on the outer end 301, a first chamber 311 adjacent to the outer end 301, and a second chamber 313 adjacent to the inner end 302. Two longitudinal guide grooves 312 are formed oppositely on an internal wall face of the first chamber 311. Two opposite recesses 314 are formed in an external face of the hollow housing 31 adjacent to the inner end 302 of the hollow housing 31. One of the recesses 314 engages the rectangular front end 233 of the spindle 23 to arrest rotation of the spindle 23 and the second driving piece 24 when the spindle 23 is moved to the locked position. The second chamber 313 has a guide seat 315 adjacent to the first chamber 311, and a release pin 316 extending transversely therethrough adjacent to the inner end 302 of the hollow housing 31.

The latch bolt 32 is formed of two halves and is mounted slidably inside the first chamber 311. The latch bolt 32 has an outer tapered head portion 324 and an inner body portion 322 formed inwardly of the tapered head portion 324. The body portion 322 is longer than the tapered head portion 324. The tapered head portion 324 includes a tip and two converging beveled faces extending to the tip. Two bosses 321 extend from an external face of the body portion 322 in opposite directions and engage the guide grooves 312 respectively so as to slide longitudinally of the hollow housing 31. The body portion 322 of the latch bolt 32 is hollowed and has a longitudinal blind bore 325, and two opposed openings 326 communicated with the blind bore 325 at two sides of the blind bore 325. A pair of retractable protrusion balls 323 are received respectively in the openings 326 and extend partially into the blind bore 325. The connecting rod 35 has a first end 353 extending into the blind bore 325 and connected telescopically to the body portion 322, and a second end 354 opposite to the first end 353. The first end 353 of the connecting rod 35 is formed with two tapered cam faces 3531 for camming the protrusion balls 323 to project outwardly from the openings 326 of the body portion 322 in a direction transverse to the direction of movement of the body portion 322.

Figure 6:
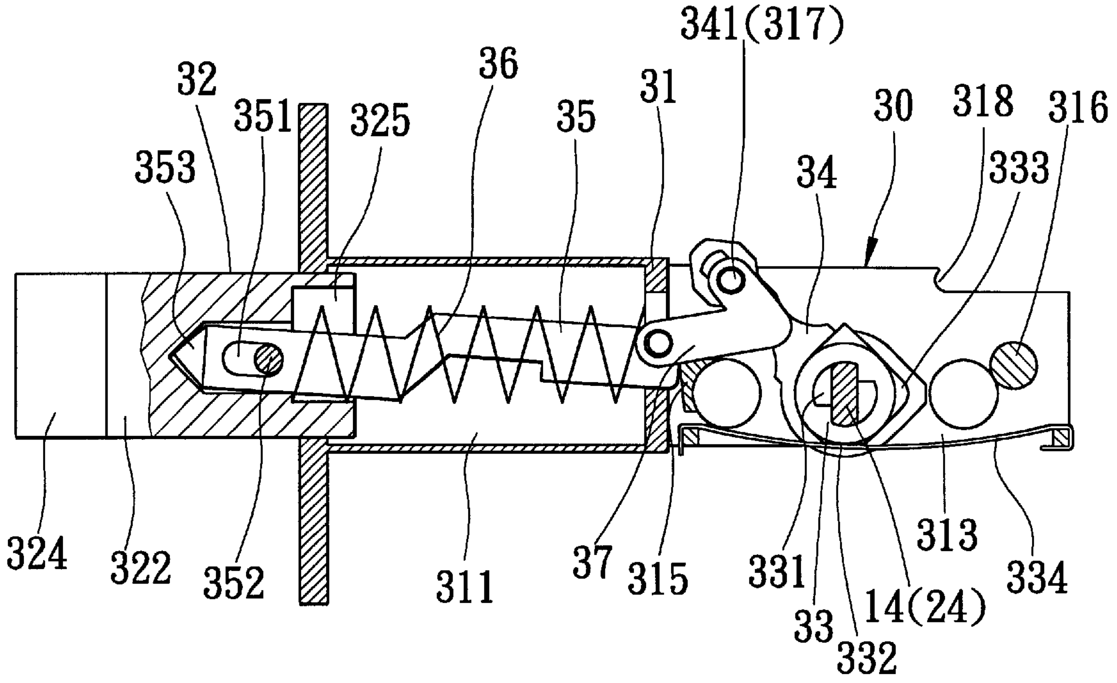
FIG. 6 is a cross sectional side view of the locking mechanism of the preferred embodiment when in a first operative position.
Figure 10:
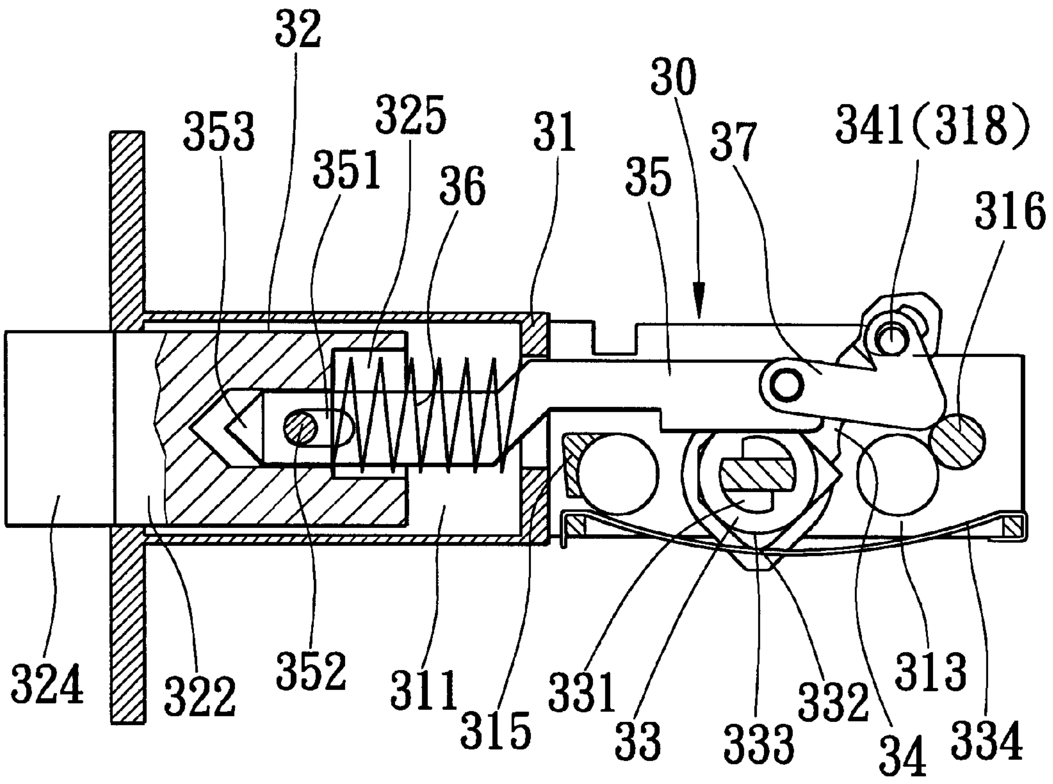
FIG. 10 is a schematic side view of the locking mechanism of the preferred embodiment when in a third operative position.

The actuating block 33 has two opposed ends 330 journalled in the second chamber 313 adjacent to the inner end 302 of the hollow housing 31, and a through hole 331 extending through the opposed ends 330. The rear end of the first driving piece 14 and the front end of the second driving piece 24 are inserted into and engage respectively the opposed ends 330 of the actuating block 33 in order to rotate the actuating block 33. The actuating block 33 has a flat portion 332 and a lobe portion 333 formed thereon. A spring plate 334 abuts against a bottom portion of the actuating block 33 to urge the actuating block 33 to move upwardly. Each of the crank arms 34 has opposite first and second ends 340, 342. The first end 340 of each of the crank arms 34 is connected to a corresponding one of the opposed ends 330 of the actuating block 33 so as to be turned by the actuating block 33 to move the second end 342 thereof. A substantially V-shaped angled plate 37 is connected pivotally to the second end 342 of each of the crank arms 34 at one end thereof by means of a pin member 341, and is connected to the second end 354 of the connecting rod 35 at the other end thereof. As such, the latch bolt 32 can be moved by the crank arms 34 via the connecting rod 35 to a first latching position in which both of the tapered head portion 324 and the body portion 322 extend outwardly of the outer end 301 of the hollow housing 31 through the opening 381 of the faceplate 38, as best illustrated in FIG. 6, and a second latching position in which only the tapered head portion 324 extends outwardly of the outer end 301 of the hollow housing 31 through the opening 381, as best illustrated in FIG. 10. The latch bolt 32 is in the second latching position when the second ends 342 of the crank arms 34 are turned to an inward position adjacent to the inner end 302 of the hollow housing 31. The latch bolt 32 is in the first latching position when the second ends 342 of the crank arms 34 are turned to an outward position. A spring 36 is disposed inside the first chamber 311 for biasing the latch bolt 32 to move to the first latching position. The spring 36 is disposed around the connecting rod 35 and is limited from extending into the second chamber 313.

Figure 12:
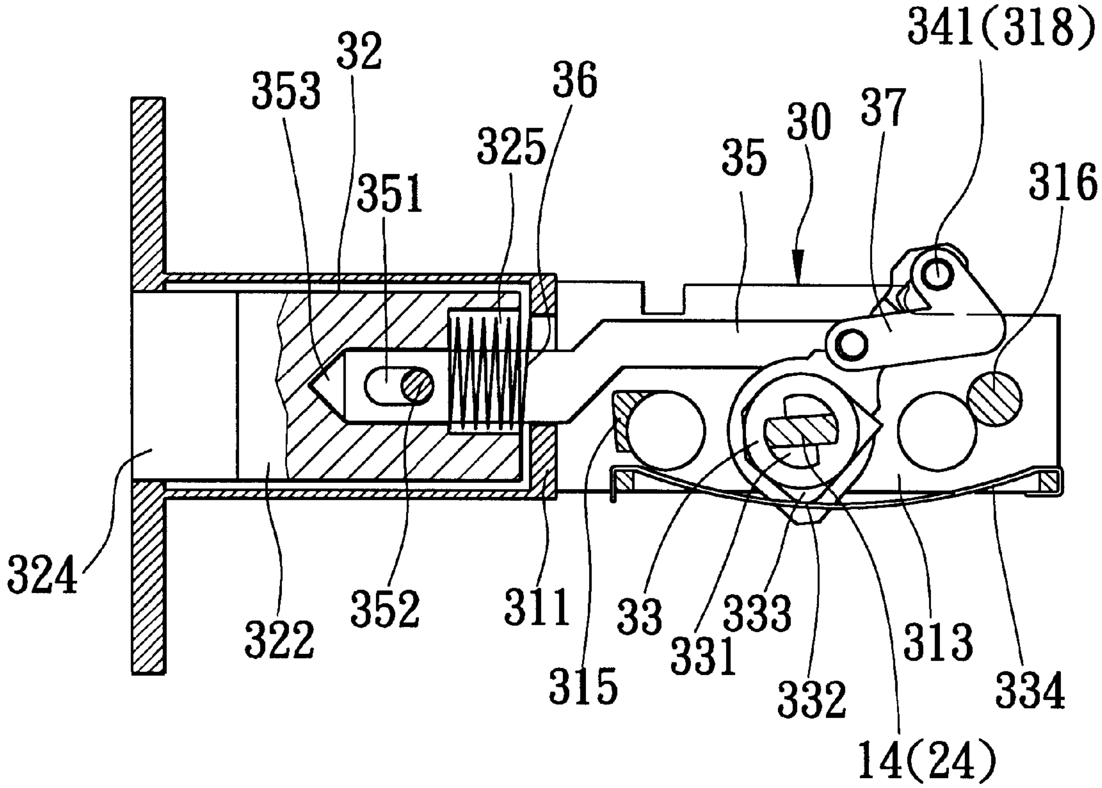
FIG. 12 is a schematic side view of the locking mechanism of the preferred embodiment when in a fourth operative position.

The latching mechanism 30 further has retaining means mounted on the second chamber 313 for retaining the second ends 342 of the crank arms 34 in the inward position so as to place the latch bolt 32 in the second latching position against the action of the spring 36. The connecting rod 35 is joined to the body portion 322 by means of telescopic joint means so that the latch bolt 32 is retractable inward relative to the connecting rod 35 against the action of the spring 36 to move to an unlatched position, as best illustrated in FIG. 12. The second chamber 313 has releasing means disposed therein for causing the second ends 342 of the crank arms 34 to be released from the retaining means when the latch bolt 32 is moved to the unlatching position from the second latching position, thereby moving the latch bolt 32 to the first latching position. The body portion 322 is movable relative to the connecting rod 35 with a length limited by the telescopic joint means so that the connecting rod 35 is moved inward along with the body portion 322 and acts on the releasing means when the latch bolt 32 reaches the unlatching position. More specifically, the telescopic joint means includes a pivot pin 352 passing through the body portion 322 and an elongated pivot hole 351 formed adjacent to the first end 353 of the connecting rod 35 to permit the pivot pin 352 to move in a direction along which the body portion 322 moves. The retaining means is a notch 318 formed on the hollow housing 31 adjacent to the inner end 302. The pin member 341 serves as an engaging member to engage the notch 318 when the second ends 342 of the crank arms 34 are turned to the inward position. The release pin 316 serves as the releasing means and contacts against the V-shaped angled plate 37 upon the inward movement of the connecting rod 35, thereby disengaging the second ends 342 of the crank arms 34 from the notch 318. The hollow housing 31 further has an indentation 317 formed thereon outwardly of the notch 318 to restrain the second ends 342 of the crank arms 34 in the outward position.

The strike plate 40 has a socket member 41 into which the latch bolt 32 extends when the latch bolt 32 is in the first latching position. The socket member 41 has an internal wall face with an opposed pair of depressions 42 to engage the balls 323 when the latch bolt 32 is in the first latching position.

The operations of the door lock assembly are described hereinbelow.

Figure 7:
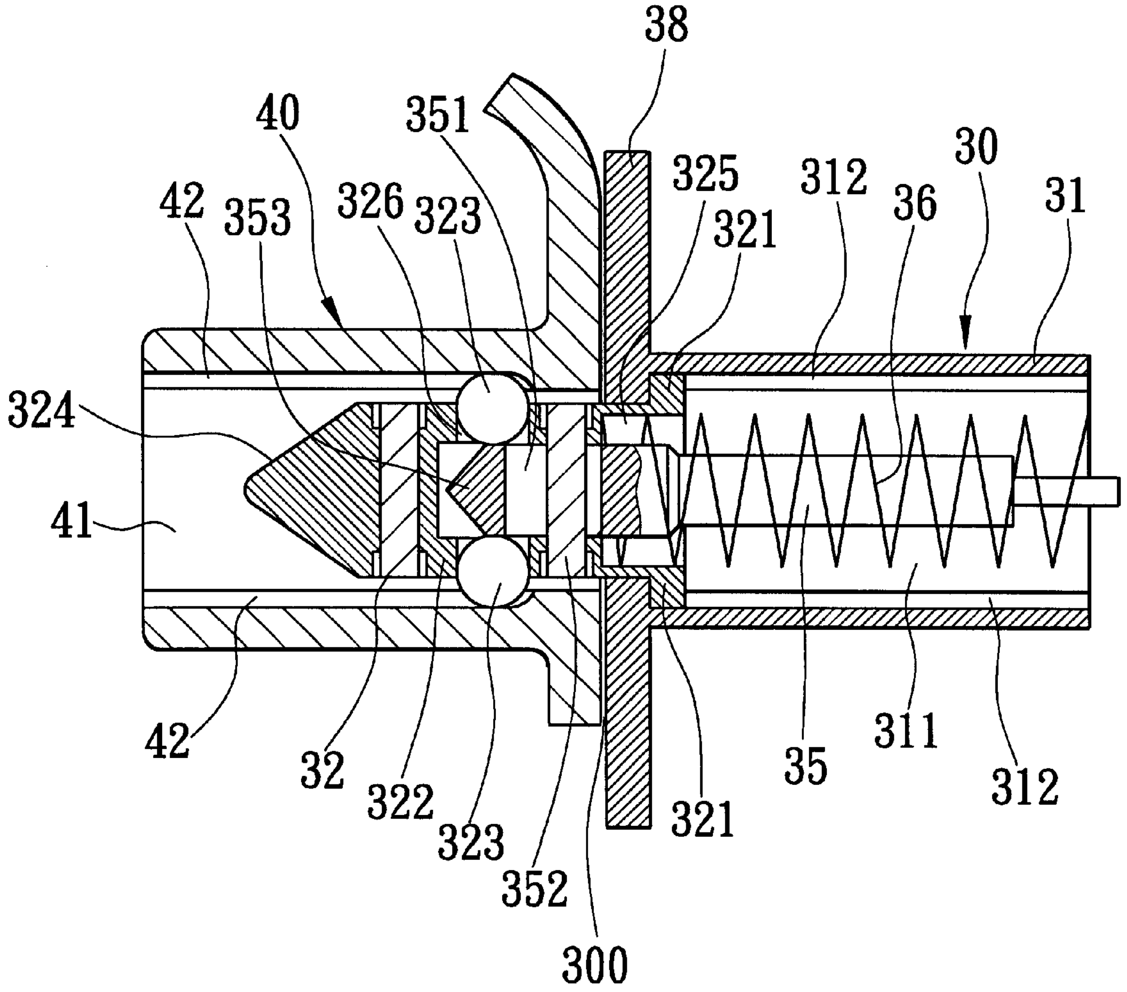
FIG. 7 is a cross sectional top view of the locking mechanism of the preferred embodiment when in the first operative position.

Referring to FIGS. 6 and 7, the latch bolt 32 extends into the socket member 41 of the strike plate 40. Since the tapered head portion 324 of the latch bolt 32 is received deeply inside the socket member 41, the latch bolt 32 will not be easily moved to unlatch the latch bolt 32 when a stick or the like is extended through a clearance 300 between the face plate 37 and the strike plate 40. In addition, because the balls 323 engage the depressions 42, the engaging force of the latch bolt 32 and the socket member 41 is enhanced. Thus, the anti-picking effect of the door lock assembly of the present invention is satisfactory.

Figure 8:
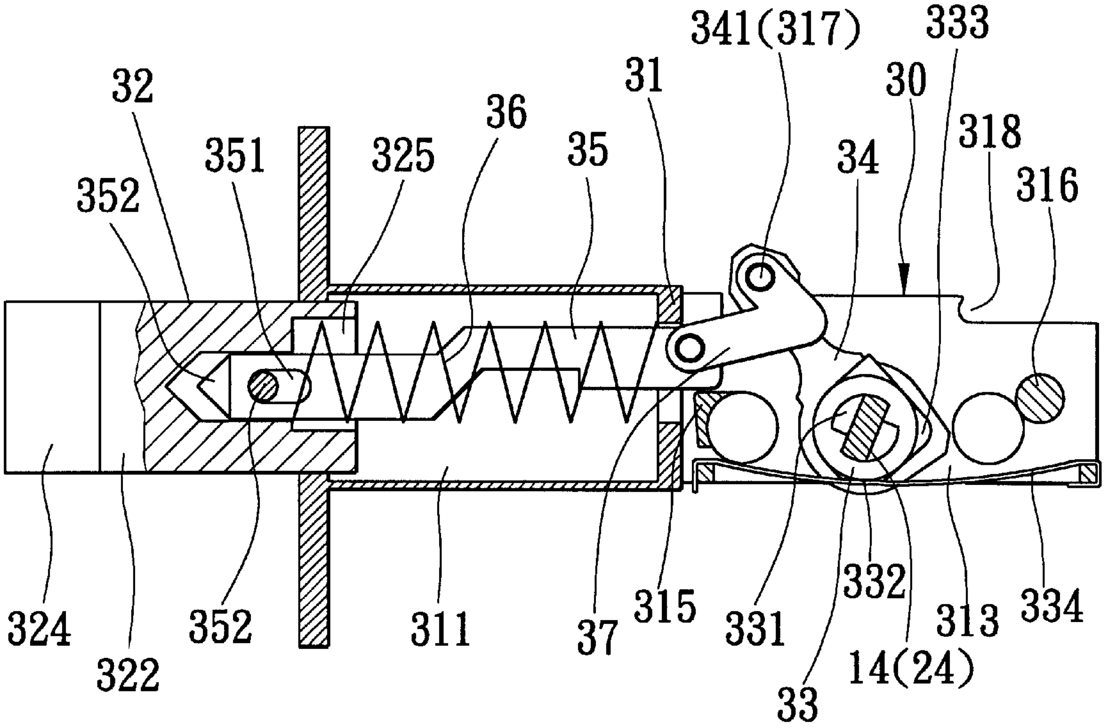
FIG. 8 is a schematic side view of the locking mechanism of the preferred embodiment when in a second operative position.
Figure 9:
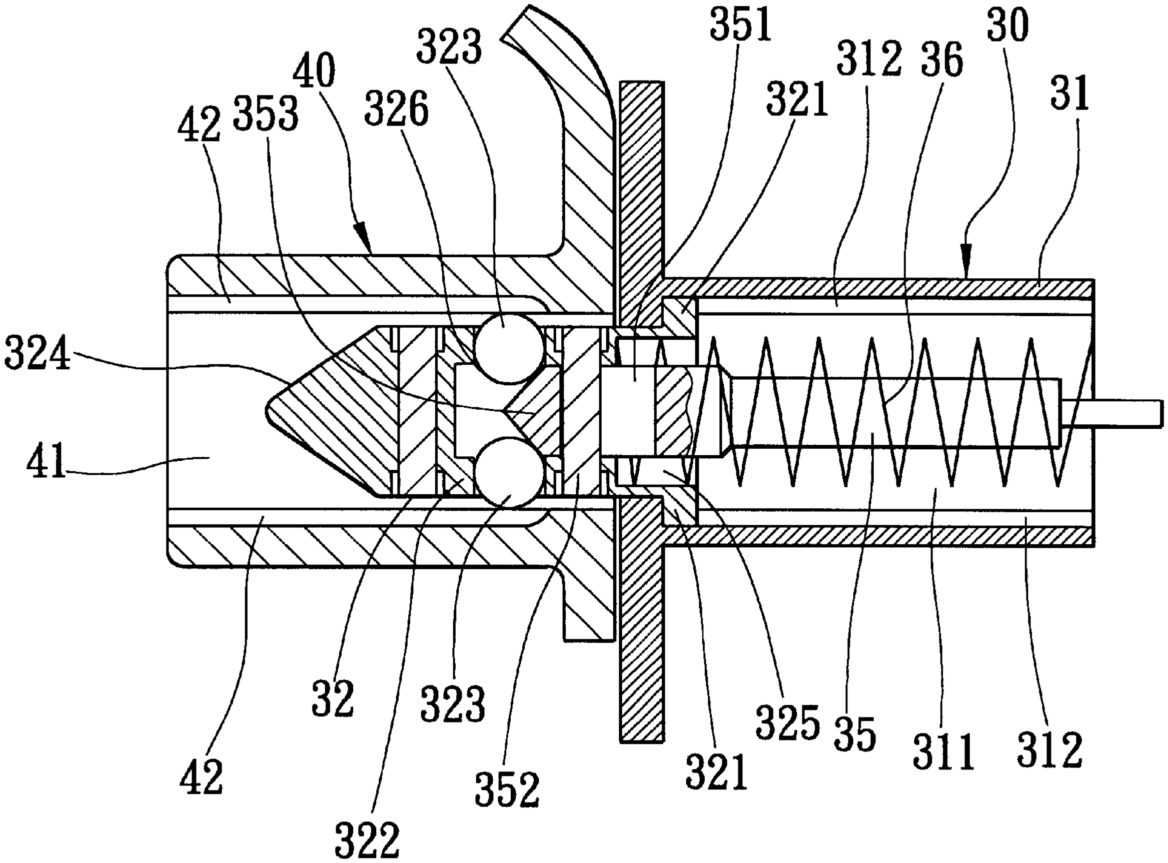
FIG. 9 is a cross sectional top view of the locking mechanism of the preferred embodiment when in the second operative position.

Referring to FIGS. 8 and 9, when it is desired to open the door, a key (not shown) is inserted into the key-operated lock 13 or the triangular head 221 of the release tube 22 is rotated to drive the first driving piece 14 or the second driving piece 24 to rotate the actuating block 33 clockwise. As such, the latch bolt 32 is moved inward via the connecting rod 35. Before the actuating block 33 is rotated, the spring plate 334 contacts the flat portion 332 of the actuating block 33. When the actuating block 33 is rotated initially, the connecting rod 35 contacts the guide seat 315 and moves rearwardly and upwardly by the guiding action of the guide seat 315. As such, the pin member 341 at the second ends 342 of the crank arms 34 can disengage from the indentation 317 and move from the outward position to the inward position of the second ends 234. At this time, the first end 353 of the connecting rod 35 moves inward relative to the latch bolt 32 to permit disengagement of the balls 323 from the depressions 42 in the socket member 41. Then, the latch bolt 32 is moved from the first latching position toward the second latching position thereof.

Figure 11:
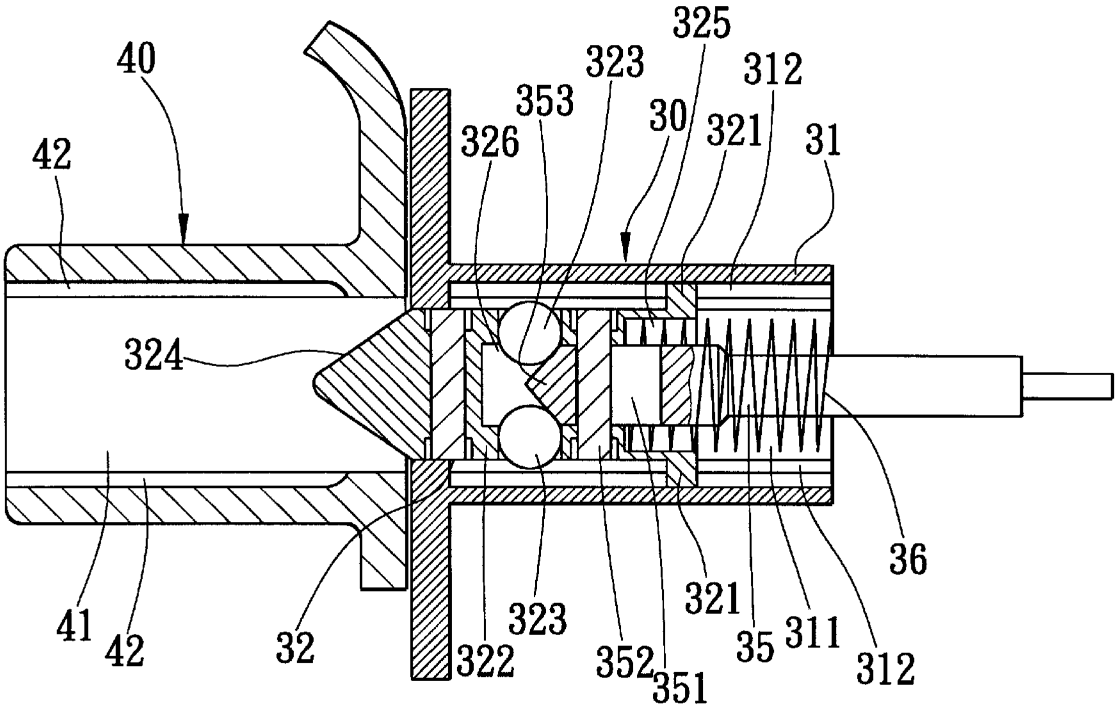
FIG. 11 is a cross sectional top view of the locking mechanism of the preferred embodiment when in the third operative position.

Referring to FIGS. 10 and 11, when the actuating block 33 is rotated by 90 degrees, the lobe portion 333 is rotated to abut the spring plate 334 against the action of the spring plate 334. Meanwhile, the pin member 341 on the second ends 342 engages the notch 318, and the V-shaped angled plate 37 abuts against the release pin 316. At this time, the latch bolt 32 is in the second latching position.

Figure 13:
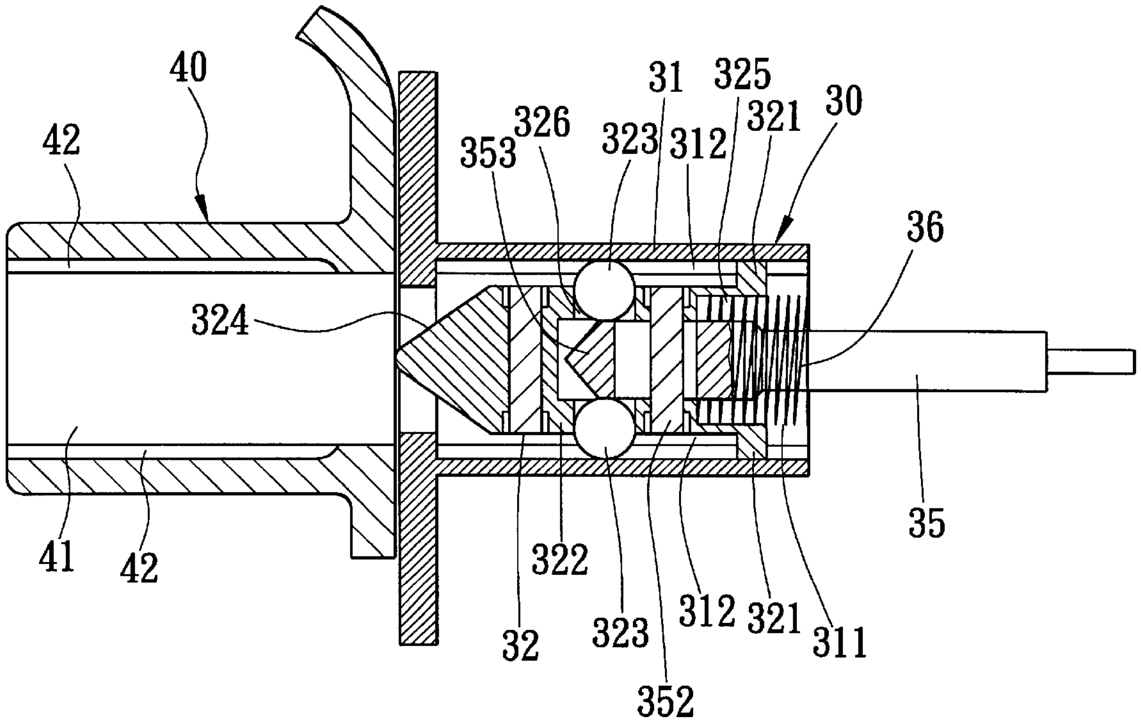
FIG. 13 is a cross sectional top view of the locking mechanism of the preferred embodiment when in the fourth operative position.

Referring to FIGS. 12 and 13, when the user pushes the door 100 relative to the doorframe, the latch bolt 32 is moved rearwardly from the second latching position toward the unlatched position. The V-shaped angle plate 37 moves upwardly along the release pin 316 to disengage the pin member 341 from the notch 318. Meanwhile, the lobe portion 333 of the actuating block 33 rotates counterclockwise by the action of the spring plate 334. This facilitates the latch bolt 32 to move from the unlatched position to the first latching position by the action of the spring 36, as best illustrated in FIG. 6. In this way, the door 100 can be opened. Since the body portion 322 of the latch bolt 32 extends out from the door 100, the latch bolt 32 will not be compressed to retract into the hollow housing 31 in the door 100. Therefore, the door 100 will not be locked unintentionally when the user goes outside the door 100 without carrying the key.

When it is desired to lock the door 100 after the door 100 is open, the user rotates the triangular head 221 of the release tube 22 to move the latch bolt 32 from the first latching position to the second latching position, and then pushes or pulls the door 100 to compress the latch bolt 32 from the second latching position to the unlatched position. Thereafter, the latch bolt 32 is moved from the unlatched position to the first latching position to extend into socket member 41 in the doorframe. In this way, the door 100 can be automatically locked without using the key.

Figure 4:
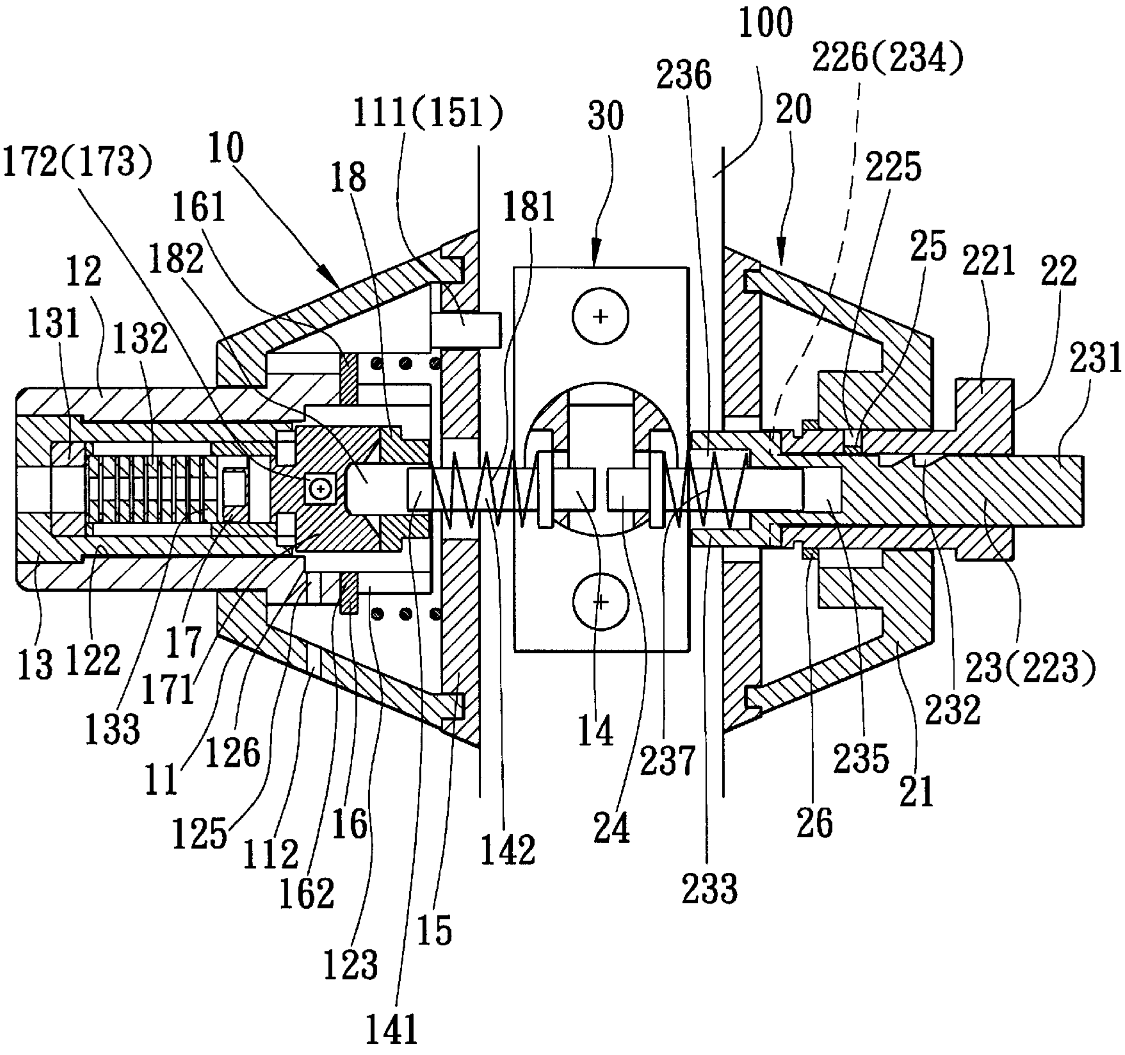
FIG. 4 is a cross sectional side view of the preferred embodiment of the door lock assembly according to the present invention.
Figure 5:
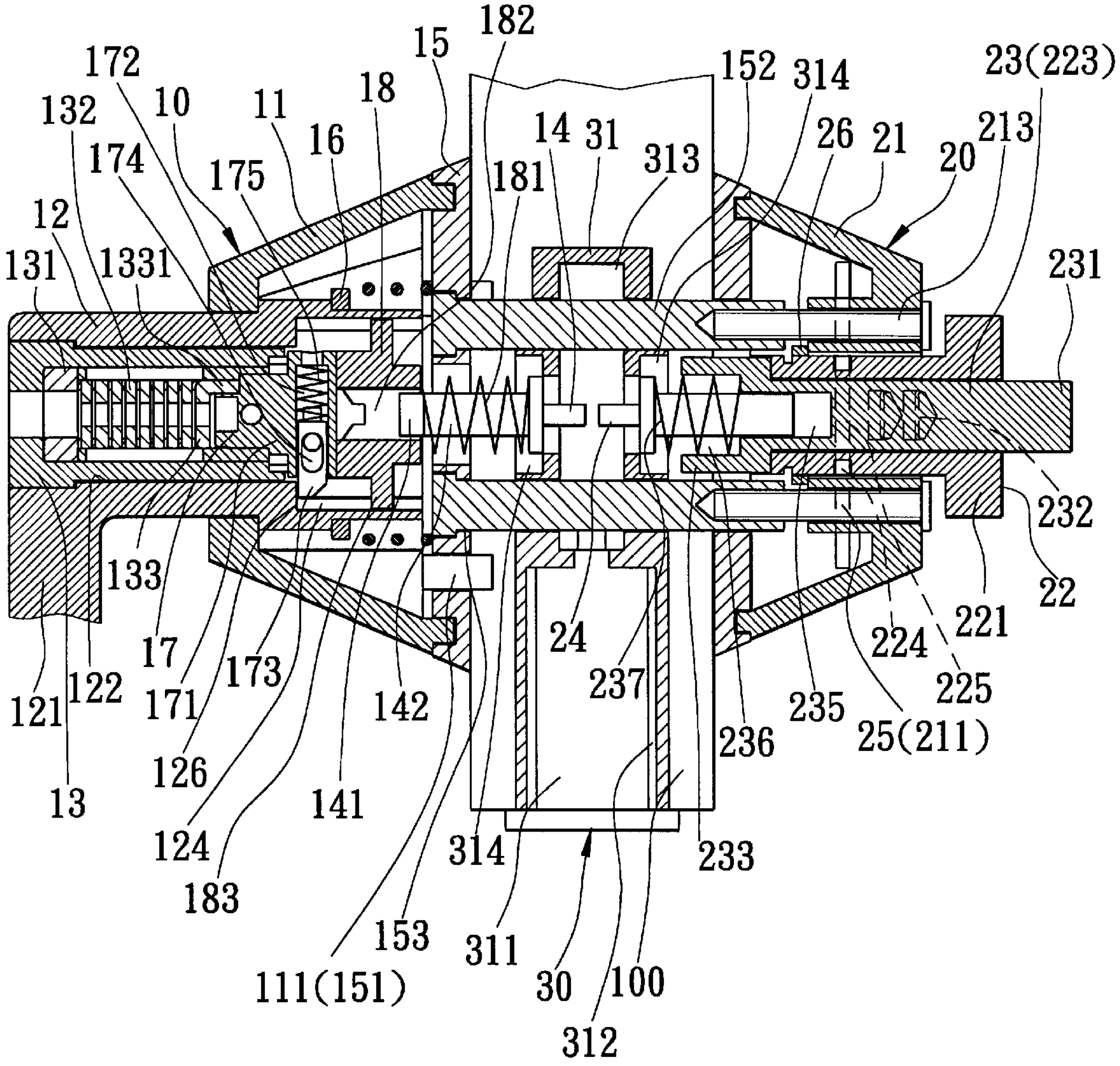
FIG. 5 is a cross sectional top view of the preferred embodiment of the door lock assembly according to the present invention.
Figure 14:
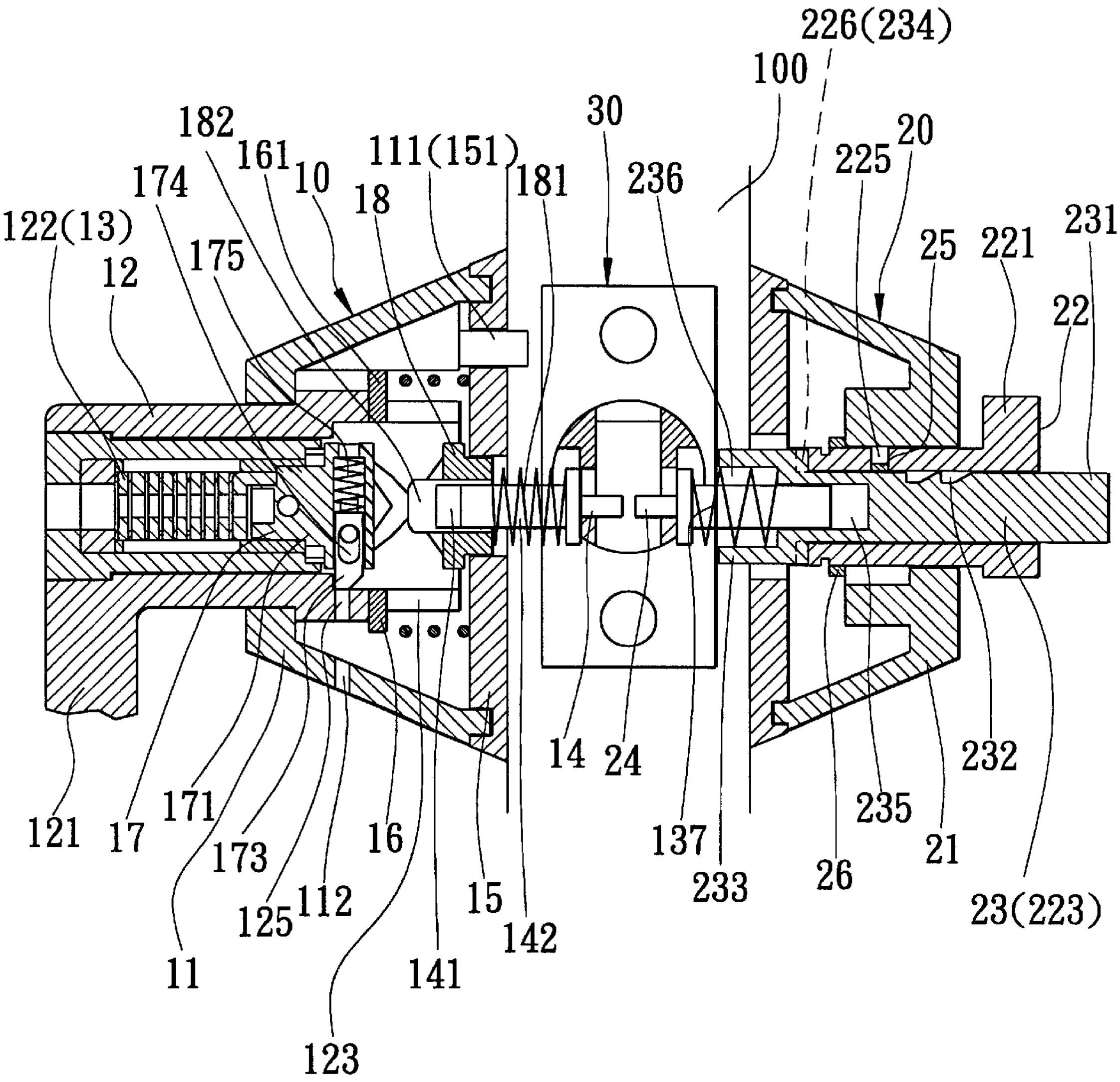
FIG. 14 is a cross sectional side view illustrating how the front locking mechanism of the preferred embodiment is manipulated by rotating a key-operated lock of the front locking mechanism.

Referring to FIGS. 4 and 5, in conjunction with FIG. 14, since the first end 141 of the first driving piece 14 is received rotatably in the second clutch member 18, the first driving piece 14 cannot rotate the actuating block 33 to move the latch bolt 33 from the first latching position to the second latching position. Therefore, the user cannot open the door 100 by simply rotating the handle 21. However, when the user rotates the first clutch member 17 via a key, the second clutch member 18 is moved to engage the first driving piece 14. At this time, the first driving piece 14 can be rotated to rotate the actuating block 33 by rotating the handle 21. In this way, the door 100 can be opened.

Figure 15:
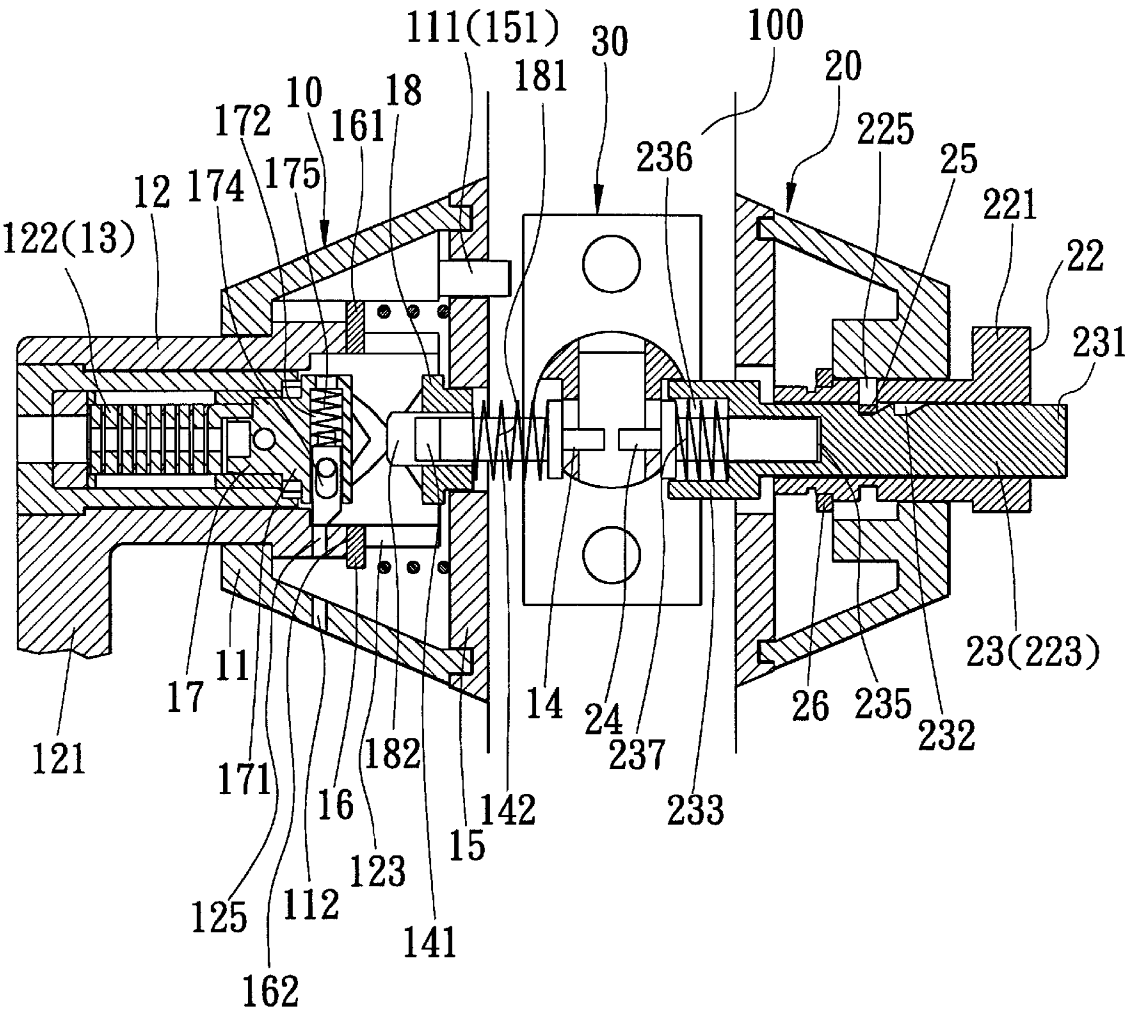
FIG. 15 is cross sectional side view illustrating a spindle of the rear locking mechanism of the preferred embodiment when moved from a released position to a locked position.

Referring to FIG. 15, when spindle 23 is compressed at its rear end 231 to move forwardly to the locked position, the resilient retaining beam 25 snaps into and engages one of the cutouts 232 in the spindle 23 through the slot 225. As such, the spindle 23 is positioned with respect to the rear casing 21. At this time, the rectangular front end 233 of the spindle 23 engages one of the recesses 314 to arrest rotation of the spindle 23 and the second driving piece 24. Therefore, when the spindle 23 is moved to the locked position after the door 100 is locked, the first driving piece 14 and the actuating block 33 cannot be rotated by the handle 12 even though the second clutch member 18 is moved to engage the first driving piece 14 via the key. That is, the latch bolt 32 is fixed relative to the hollow housing 31 to prevent the door lock assembly from being unlocked by an unauthorized person outside the door 100. On the other hand, when the spindle 23 is depressed to the locked position to retain the latch bolt 32 in the second latching position, the latch bolt 32 will not move to the first latching position to lock the door 100 automatically after the door 100 is closed relative to the doorframe.

When it is desired to release the latch bolt 32, the release tube 22 is rotated to disengage the resilient retaining beam 25 from the cutout 232 of the spindle 23. The spindle 23 is then moved from the locked position to the release position by the action of the spring member 237. At this time, the front end 233 of the spindle 23 is disengaged from the recess 314 of the hollow housing 31 to release the second driving piece 24.

Figure 16:
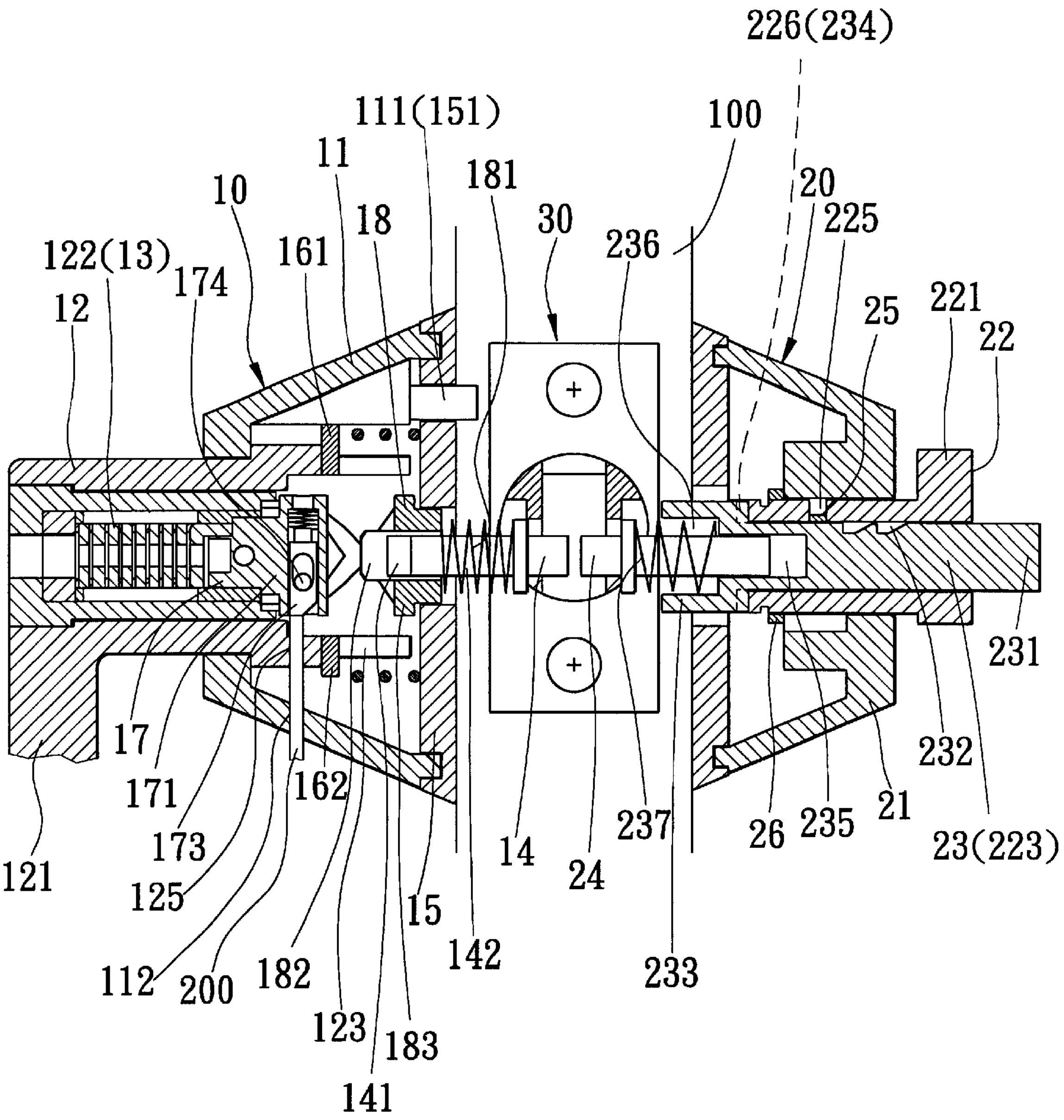
FIG. 16 illustrates how the key-operated lock is removed from the front locking mechanism of the preferred embodiment.

Referring to FIG. 16, when the handle 12 is rotated clockwise by about 90 degrees, the locking pin 173 is aligned with the aperture 112 in the front casing 11. A tool 200 is inserted through the aperture 112 and the insertion hole 125 to compress the locking pin 173 and disengage from the shoulder 126. The key-operated lock 13 is then moved out from the through hole 122 in the handle 12 due to the action of the spring member 181 via the first and second clutch members 17, 18. A new key-operated lock can be inserted into the through hole 122 and can be retained in the handle 12 by the locking pin 173. In this way, the key-operated lock 13 can be removed from the handle 12 quickly and conveniently for replacing or maintaining purposes.

Figure 17:
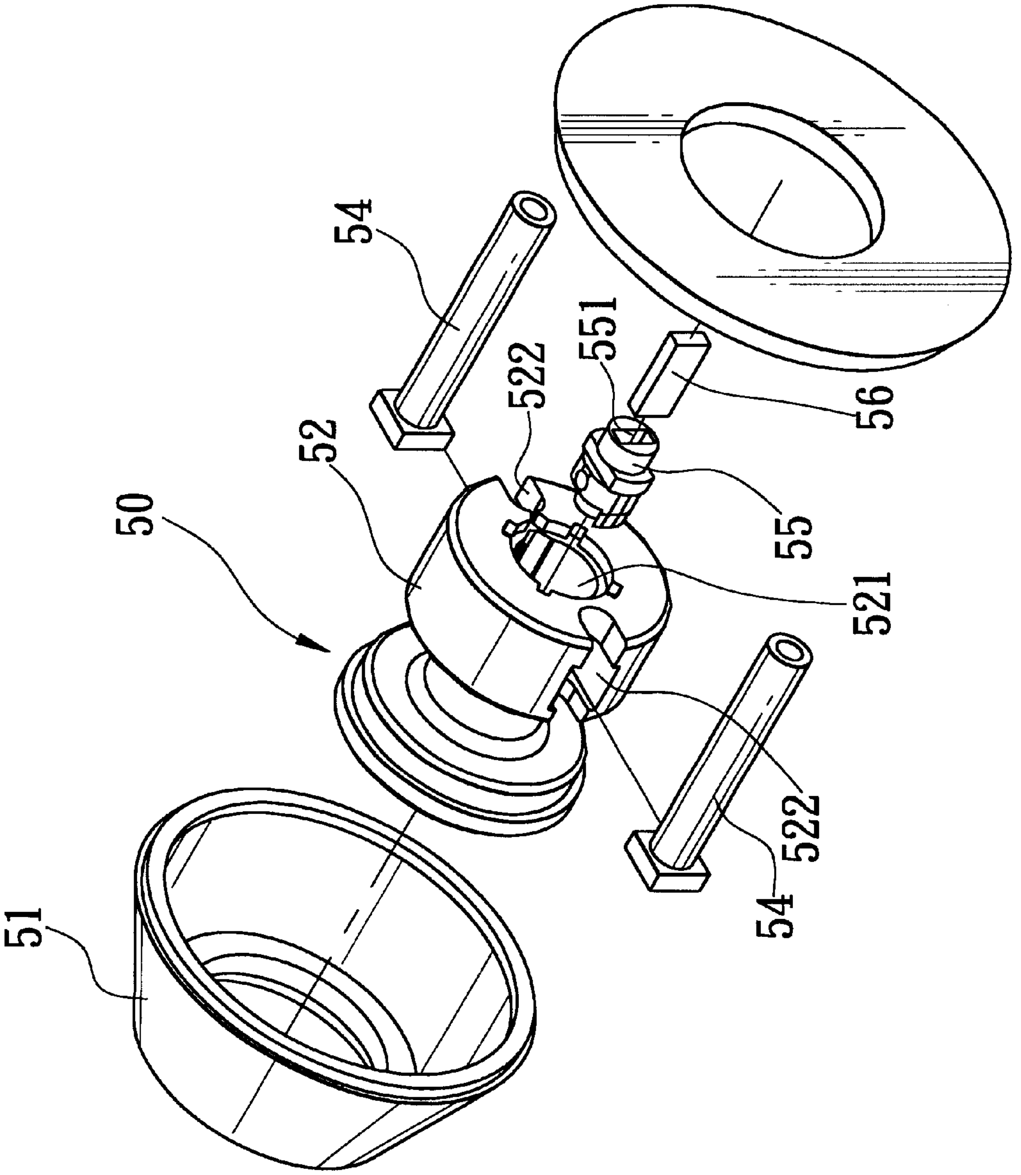
FIG. 17 is an exploded view of a second preferred embodiment of a front locking mechanism of a door lock assembly according to the present invention.
Figure 18:
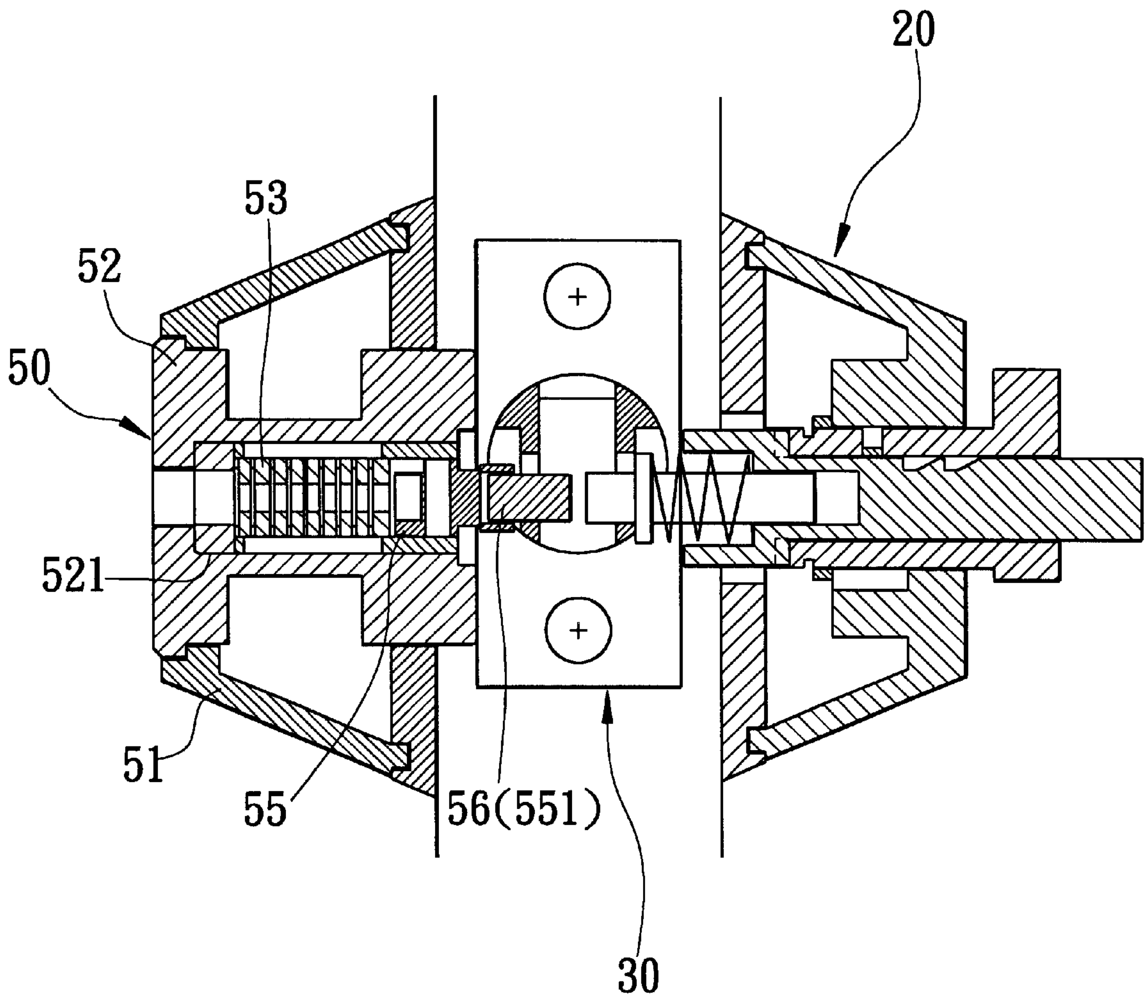
FIG. 18 is a cross sectional view of the second preferred embodiment of the door lock assembly according to the present invention.

Referring to FIGS. 17 and 18, a second preferred embodiment of a door lock assembly according to the present invention is shown to comprise a front locking mechanism 50, the rear locking 20 and the latching mechanism 30. The front locking mechanism 50 has a front casing 51 and a key-operated lock 52 mounted in the front casing 51. The key-operated lock 52 has a through hole 521 and a core 53 received in the through hole 521. Two notches 522 are formed at opposed sides of the key-operated lock 52. Two connection pillars 152 engage the notches 522 and the rear locking mechanism 20 to secure the key-operated lock 52 to the door. The rear end of the key-operated lock 52 has a transmission block 55 connected thereto. The rear end of the transmission block 55 has a blind bore 551. A first driving piece 56 is inserted into the blind bore 551 to interconnect the core 53 and the latching mechanism 30, so that the first driving piece 56 can be rotated by a key (not shown) to actuate the latching mechanism 30.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A door lock assembly comprising:

a latching mechanism adapted to latch a door, said latching mechanism including:

an elongated hollow housing which has an outer end, and an inner end opposite to said outer end;

a latch bolt mounted slidably inside said hollow housing adjacent to said outer end of said hollow housing, and including an outer tapered head portion and an inner body portion formed inwardly of said tapered head portion;

an actuating block for actuating said latch bolt, said actuating block having two opposed ends journalled in said hollow housing adjacent to said inner end;

a connecting member disposed inwardly of said latch bolt and connected telescopically to said inner body portion;

a crank arm having opposite first and second ends, said first end being connected to said actuating block so as to be turned by said actuating block to move said second end of said crank arm, said second end of said crank arm being connected to said connecting member so as to move said latch bolt via said connecting member, to a first latching position in which both of said tapered head portion and said inner body portion extend outwardly of said outer end of said hollow housing and a second latching position in which only said tapered head portion extends outwardly of said outer end of said hollow housing, said latch bolt being in said second latching position when said second end of said crank arm is turned to an inward position adjacent to said inner end of said hollow housing, said latch bolt being in said first latching position when said second end of said crank arm is turned to an outward position;

a spring mounted inside said hollow housing for biasing said latch bolt to move to said first latching position;

retaining means disposed on said hollow housing for retaining said second end of said crank arm in said inward position so as to place said latch bolt in said second latching position against action of said spring;

telescopic joint means for joining said connecting member to said inner body portion so that said latch bolt is retractable inward relative to said connecting member against the action of said spring to move to an unlatching position; and releasing means disposed inside said hollow housing for causing said second end of said crank arm to be released from said retaining means when said latch bolt is moved to said unlatching position from said second latching position, thereby moving said latch bolt to said first latching position.

2. The door lock assembly as claimed in claim 1, wherein said inner body portion is movable relative to said connecting member within a length limited by said telescopic joint means so that said connecting member is moved inward along with said inner body portion and acts on said releasing means when said latch bolt reaches said unlatching position.

3. The door lock assembly as claimed in claim 2, wherein said telescopic joint means includes a pivot pin passing through said inner body portion and said connecting member, and an elongated pivot hole provided in one of said inner body portion and said connecting member to permit said pivot pin to move in a direction along which said inner body portion moves.

4. The door lock assembly as claimed in claim 1, wherein said inner body portion is longer than said tapered head portion.

5. The door lock assembly as claimed in claim 1, wherein said tapered head portion includes a tip and two converging beveled faces extending to said tip.

6. The door lock assembly as claimed in claim 4, wherein said inner body portion is provided with at least one retractable protrusion element that projects from said inner body portion in a direction transverse to direction of movement of said inner body portion.

7. The door lock assembly as claimed in claim 6, wherein said inner body portion is hollowed to form a longitudinal blind bore and two opposed openings communicated with said blind bore at two sides of said blind hole, a pair of said protrusion elements being respectively received in said openings and extending partially into said blind bore, said connecting member having one end extending into said blind bore and connected telescopically to said inner body portion, said connecting member having cam means for camming said protrusion elements to project outward from said openings.

8. The door lock assembly as claimed in claim 1, wherein said retaining means includes notch means formed on said hollow housing, said second end of said crank arm having an engaging member to engage said notch means.

9. The door lock assembly as claimed in claim 8, wherein said releasing means is located adjacent to said inner end of said hollow housing, said connecting member contacting against said releasing means upon inward movement, thereby disengaging said second end of said crank arm from said notch means.

10. The door lock assembly as claimed in claim 9, wherein said connecting member includes a connecting rod connected telescopically to said inner body portion, and a substantially V-shaped angled plate pivotally connected to said connecting rod and said second end of said crank arm.

11. The door lock assembly as claimed in claim 1, wherein said hollow housing further includes indentation means formed thereon outwardly of said retaining means to restrain said second end of said crank arm in said outward position.

12. The door lock assembly as claimed in claim 11, wherein said hollow housing further includes a first chamber adjacent to said outer end, and a second chamber adjacent to said inner end, said actuating block, said indentation means, said angled plate, and said retaining means being provided in said second chamber, said spring being disposed around said connecting rod in said first chamber and being limited from extending into said second chamber.

13. The door lock assembly as claimed in claim 1, further comprising:

a front locking mechanism having a front casing adapted to be fixed to a front face of the door, a key-operated lock received rotatably in said front casing, and a first driving piece having a front end connected to said key-operated lock, said front spindle further having a rear end connected to said actuating block of said latching mechanism; and a rear lock mechanism having a rear casing adapted to be fixed to a rear face of the door, a spindle extending through said rear casing, and a second driving piece, said spindle having a front end, and a rear end that projects out from said rear casing, said second driving piece having a front end connected to said actuating block, and a rear end that is connected to said front end of said spindle;

said rear locking mechanism further including a spindle locking unit mounted on said rear casing to lock said spindle from rotation, and a release mechanism to release said spindle from said spindle locking unit, said rear end of said first driving piece being inserted into said actuating block, said front end of said second driving piece being inserted into said actuating block, said first driving piece being connected to said actuating block without passing through said hollow housing and without extending to said rear locking mechanism for direct connection with said release mechanism.

14. The door lock assembly as claimed in claim 13, wherein said spindle is connected telescopically to said second driving piece, said spindle being biased rearward to a released position and being compressible to move forward to a locked position, said spindle locking unit having a recess formed on said hollow housing of said latching mechanism adjacent to said actuating block for engaging said front end of said spindle so as to lock said spindle against rotation in said locked position of said spindle, said release mechanism including a release tube disposed around said spindle in a slidable and rotatable relationship, said spindle engaging and disengaging from said release tube in said released and locked positions, respectively.

15. The door lock assembly as claimed claim 14, wherein said rear casing includes a hole for passage of said release tube, and a resilient retaining member extending across said hole and fixed to said rear casing, said spindle having a periphery formed with a cutout, said release tube having an external face formed with a helical groove, said retaining member being received in said helical groove and engaging said cutout via said helical groove in said locked position of said spindle, said retaining member being releasable from said cutout upon turning movement of said release tube, said release tube being perforated in said helical groove to communicate said helical groove with said cutout.

16. The door lock assembly as claimed in claim 12, further comprising a strike plate having a socket member into which said latch bolt extends when said latch bolt is in said first latching position, said socket member having an internal wall face with a depression to engage said retractable protrusion element.

17. The door lock assembly as claimed in claim 16, wherein said first chamber has two longitudinal guide grooves formed oppositely on an internal wall face thereof, said inner body portion of said latch bolt having two bosses extending from an external face thereof in opposite directions to engage said guide grooves, respectively.

18. The door lock assembly as claimed in claim 13, wherein said front locking mechanism further includes a clutch mechanism mounted inside said front casing and connected to said key-operated lock and said first driving piece to engage and disengage said first driving piece from said key-operated lock.

19. The door lock assembly as claimed in claim 18, wherein said front locking mechanism further includes a handle mounted rotatably on said front casing, said clutch mechanism including a first clutch member connected to said key-operated lock, and a second clutch member connected to said first clutch member and said handle and engageable with said first driving piece upon operation of said key-operated lock.

20. The door lock assembly as claimed in claim 19, wherein said first clutch member has a front end connected to said key-operated lock and a rear end formed with a cam face for camming said second clutch member to move rearward, said second clutch member being biased to abut against said cam face.

21. The door lock assembly as claimed in claim 20, wherein said front casing has an aperture, said handle having an insertion hole aligned with said aperture, said front casing having a shoulder formed in an inner face thereof adjacent to said insertion hole, said first clutch member having a spring-loaded pin extending out therefrom and engaging said shoulder of said front casing in order to retain said first clutch member and said key-operated lock in said handle, said spring-loaded pin being aligned with said insertion hole when said key-operated lock is rotated to a predetermined position.

22. The door lock assembly comprising:

a latching mechanism adapted to latch a door;

a front locking mechanism having a front casing adapted to be fixed to a front face of the door, a key-operated lock received rotatably in said front casing, and a first driving piece having a front end connected to said key-operated lock, said front spindle further having a rear end connected to said latching mechanism; and a rear locking mechanism having a rear casing adapted to be fixed to a rear face of the door, a spindle extending through said rear casing, and a second driving piece, said spindle having a front end, and a rear end that projects out from said rear casing, said second driving piece having a front end connected to said latching mechanism, and a rear end that is connected to said front end of said spindle;

said rear locking mechanism further including a spindle locking unit mounted on said rear casing to lock said spindle from rotation, and a release mechanism to release said spindle from said spindle locking unit, said rear end of said first driving piece being inserted into said latching mechanism, said front end of said second driving piece being inserted into said latching mechanism, said first driving piece being connected to said latching mechanism without passing through said latching mechanism and without extending to said rear locking mechanism for direct connection with said release mechanism.

* * * * *